May 21, 1968 — W. C. WEHNER — 3,384,397

BALL JOINT

Filed Oct. 18, 1965

INVENTOR
WILLIAM C. WEHNER
BY
*Burton & Parker*
ATTORNEYS

United States Patent Office 3,384,397
Patented May 21, 1968

3,384,397
BALL JOINT
William C. Wehner, Detroit, Mich., assignor to Moog Industries, Inc., St. Louis, Mo., a corporation of Missouri
Filed Oct. 18, 1965, Ser. No. 497,391
2 Claims. (Cl. 287—90)

ABSTRACT OF THE DISCLOSURE

The invention contemplates the provision of a helical spring substantially in one plane between a flexible depending skirt portion of a bearing member and the surrounding housing wall of a ball joint, with the spring actuating the bearing member to take up wear.

---

This invention relates to improvements in self-adjusting swivel joints, having particular though not exclusive utility in ball joints of the compression-loaded type employed in automotive wheel suspension systems.

Summary

The provision of a helical spring essentially in one plane in a ball joint housing provides for automatic wear take up without requiring additional space within the housing or special assembly tools on temporary locking means when the joint is assembled and automatically maintains a zero clearance between the ball head and the axially related load bearing surfaces, thus obviating manual adjustment.

In a compression-loaded ball joint the load on the ball tend tends to push the ball into the socket. In the tension-loaded joints the load tends to pull the ball out of the socket. In an automotive suspension system, the ball joints support the weight of the vehicle, and may either be compression or tension-loaded. In a compression-loaded ball joint the ball member is compression-loaded downward into the opposed bearing surface. Road shocks and vibration tend to lift the ball member from its bearing surface in the socket, and if there are clearances within the joint, the ball member will repeatedly impact against the bearing surfaces. Automatically adjustable ball joints have been developed for tension-loaded joints, however the problems inherent in a compression-loaded joint tend to make these designs unacceptable for compression-loaded ball joints. For example, the automatically adjustable tension-loaded ball joint disclosed in prior applications has the ball head continually and non-reversibly urged against the load-carrying bearing set in the socket by an upper bearing member acted upon by a pair of threaded elements spring-tensioned to continually expand and thereby urge the upper bearing against the ball head. The same structure disclosed in such prior applications would not be functional in a compression-loaded ball joint because the compressive loading urges the ball head against the upper bearing locking the threaded elements and preventing the threaded expansion under the force of the spring. Further, the space available for a spring-tensioning means is much more restricted in a compression-loaded ball joint than in a tension-loaded joint. Therefore, automatically adjustable systems which require space for the spring, or other tensioning means, to expand within the joint have not been found acceptable.

Despite the efforts of others there had been a continuing need, particularly in the automotive suspension system, for a compression-loaded ball joint which automatically adjusts itself to remain tight enough to prevent chatter and vibration, while allowing the requisite freedom of rotation and tilting between the socket and the stud. Improvements in compression-loaded ball joint designs have been primarily directed to the elimination of wear between the ball stud and the housing, in the belief that frictional wear is the major cause of ball joint failures. My experiences led me to the conclusion that ball joints are destroyed by impact loading, which increases the clearance between the ball head and the bearing surfaces until impact destruction occurs. A ball joint embodying my present invention automatically maintains a zero clearance between the ball head and the axially related load-bearing surfaces, thus eliminating the need for manual adjustment.

An object of the present invention is to overcome the difficulties and disadvantages inherent in the prior art compression-loaded ball joints, and to provide a ball joint particularly suitable for use in automotive wheel suspension systems which are capable of automatic and continuous self-adjustment, so that service, deterioration, and human error factors are avoided, and which is reasonable in cost, and provides ease of manufacture and assembly.

Another object of this invention is the provision of an automatically adjustable compression-loaded ball joint wherein the upper bearing is fixed within the housing, and the lower bearing is continuaully and non-reversibly urged against the under opposed surface of the ball to maintain a zero clearance between the ball head and the axially re- ing.

Another important object is the provision of an automatically adjustable compression-loaded ball joint where the energizing means for the lower bearing does not expand, thereby not requiring additional space within the housing.

Another object of this invention is the provision of an automatically adjustable compression-loaded ball joint wherein the entire joint may be assembled from an open end of the housing, and does not require special tools or temporary locking means when the joint is being assembled.

Another object of the invention is to provide a ball joint having a standard housing and load-transmitting stud with an automatically operable wear-takeup unit, and to provide simple means for sealing the assembly so that foreign matter is excluded from the interior working portions of the unit.

Other objects, advantages, and meritorious features will more fully appear from the specification, claims, and accompanying drawings, wherein:

Figure 1:
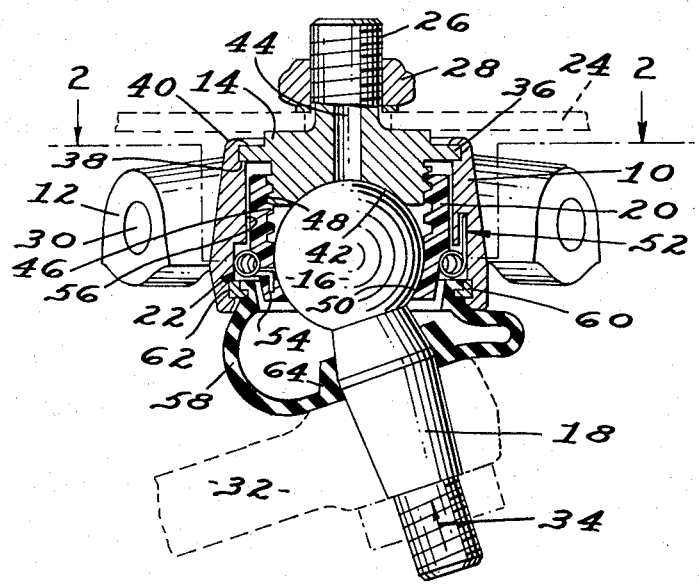
FIG. 1 is a cross-sectional view of one embodiment of my invention shown connected to an automotive suspension system.

Referring to the drawings, wherein the ball joint assembly of this embodiment of my invention includes: a housing 10 having a pair of ears 12 for securing the assembly to another member such as an automotive suspension A-arm, an upper bearing element 14 secured against rotation within the housing, a ball stud having an enlarged ball portion 16 in bearing engagement with the upper bearing element, and a shank portion 18 extending out of the housing, and a lower bearing element 20 threadably received on the upper bearing element and in bearing engagement with the opposed surface of the ball, and a spiral spring-tensioning means 22 which continually urges the lower bearing element threadably toward the upper bearing element.

Figure 2:
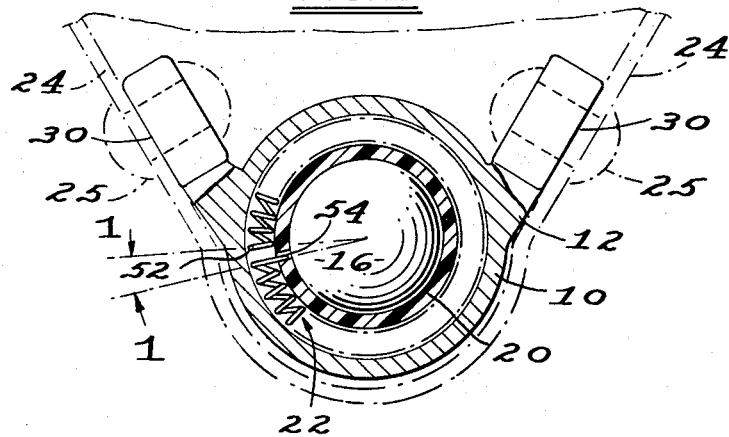
FIG. 2 is a cross-sectional top view of FIG. 1 shown in the direction of view arrows 2—2.

In FIGS. 1 and 2, a portion of an automotive suspension A-arm is shown in phantom 24 to illustrate the means of securing the ball joint assembly to the A-arm. A threaded post 26 extends from the upper portion of the bearing element 14, through an aperture in the A-arm, where it is secured by a threaded nut 28. The housing ears 12 are provided with apertures 30 for riveting, as at 25, or bolting the housing to the sides of the A-arm, shown at 24 in FIG. 2. Thus, the ball joint is secured at three positions to the A-arm, providing a rigid connection. The ball stud shank 18 is shown in FIG. 1 connected to an automotive suspension control arm, shown in phantom at 32. The control arm transmits compressive loading to the ball joint in the direction of arrow 34.

It can be seen from FIG. 1 that the ball head 16 is normally maintained in compression against the upper bearing 14, however road shock, and other vibration normally encountered in automotive suspension systems, tend to retract the ball from its seat in the upper bearing, causing destructive impact loading at the upper bearing. Conventional compression-loaded ball joint designs have a built-in clearance between the ball member and the lower bearing surfaces, because of the difficulty and expense of maintaining close tolerances. This spacing increases with frictional and impacting wear, until the joint "pounds out" or shatters on impact. This problem has recently been eliminated in tension-loaded ball joints, but these improvements are not readily adaptable to compression-loaded systems.

In this embodiment of my invention, the upper bearing 14 is fixed against rotation and oscillation within the housing 10, by seating the flanged portion of the bearing 36 in the housing counterbore 38, and spinning the upper portion of the housing 40 against the bearing element flange. It is important to prevent the rotation of the upper bearing for at least two reasons; first, the bearing will not be effective as a bearing if it is allowed to rotate with the ball 16, and second, the upper bearing cannot be allowed to rotate with the lower bearing 20, or the automatic adjustment feature will not function, as will be described hereinafter. However, the means described of securing the bearing against rotation is considered illustrative only, and any well known means may be employed.

The spherical, or spherically curved bearing surface 42 of the upper bearing is preferably a non-resilient or malleable material, such as bronze, steel, or lead. The bearing surface may be of the same material as the bearing element 14, as shown in FIG. 1, or the bearing surface may be a separate element, or a coating on the bearing element, such as a surface coating of bronze or lead on steel, or lead on bronze. The bearing is preferably non-resilient to prevent the impact loading previously described.

The upper bearing may be provided with a lubrication channel 44, which could be sealed at the inlet with a zerk fitting, or the like. The channel 44 could also be permanently sealed, in which case the channel 44 would function as a grease reservoir. The lower portion of the bearing 14 is externally threaded at 48 for threaded connection with the internal threads 46 on the lower bearing 20, as described below.

The lower bearing element 20 is threadably received on the upper bearing 14, and is provided with an opposed spherically curved bearing surface 50, in bearing engagement with the opposed or underside of the ball head 16.

The lower bearing is preferably made from a relatively non-resilient material which will cold flow under the contemplated range of compressive forces built into the ball joint, but which will not deform under shock or impact loading such as would arise from road shocks. The ability of the bearing 20 to cold flow under compressive force, allows the bearing to compensate for dimensional tolerances inherent in the bearing and the ball member, while maintaining the requisite tightness for a "zero clearance" condition. The bearing should also be capable of absorbing metal particles resulting from frictional wear of the ball member and the bearing surfaces. A cold-flowing material will deform to accept these particles without sacrificing its bearing capacity. A bearing material which meets these requirements is a hard thermoplastic resin, such as a family of acetal resins. An example of this material is Du Pont Delrin, however other suitable materials may be used, such as nylon or other thermoplastic resinous materials. The lower bearing might also be metallic, however the lower bearing 20 is preferably not the same material as the upper bearing 14 to prevent rust or "freezing" of the threaded surfaces.

Figure 3:
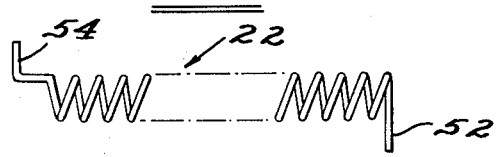
FIG. 3 is a side elevation of the spiral spring tensioning means.

It can be seen from FIG. 1, that by threading the lower bearing 20 toward the upper bearing 14, the ball 16 is urged by the lower bearing surface into compression against the upper bearing surface 42. Further, if the lower bearing is continuously urged upward, the ball member will be automatically maintained in compression against the upper bearing surface, resulting in what is termed a "zero clearance" condition. This result is accomplished by the coil spring 22, shown before securement in FIG. 3. The coil spring extends 360 degrees around the lower bearing 20, and is tensioned between the housing, where it is secured at 52, and the lower bearing, where it is secured at 54. The tension provided in the spring tends to thread the lower bearing upward to compensate for a clearance which might develop between the ball and the bearing surfaces.

A slight clearance is provided between the lower bearing and the inner surface of the housing 56 to allow the lower bearing to "float" within the housing, and to prevent frictional resistance to the threading movement of the lower bearing. A relatively coarse thread between the bearing elements, such as a 1¼–8 Acme thread, is also desirable to obtain a relatively large vertical movement of the lower bearing with a relatively small circumferential threading. The threads 46 and 48 on the bearing elements are, however, of a sufficiently gradual pitch so that the threaded bearing element 20 is self-locking, that is to say an axial force directed downwardly against the bearing 20 will not cause the part to thread its way downwardly, but rather the bearing 20 will resist such axial force within yielding movement. The amount of axial force imposed on the stud head by the threaded bearing 20 is a function of the tension imposed on the bearing element by the spring 22 and the pitch of the threads 46 and 48, and these may be varied independently within the limitations of the spring, and the requirements of self-locking threads, described herein. It is also evident that the bearings cannot unthread to increase the clearance because of the spring, but is locked against unthreading.

The spiral spring described and illustrated has an important advantage over the spring energizing means previously employed, especially in compression-loaded systems where the space available is very restricted. Spring systems previously employed required the spring to expand to take up tolerances, or thread the cooperating elements. The spiral spring of this embodiment of my invention contracts as it threads the lower bearing element toward the ball member, and the space required for the spring is initially small because the spring extends around the lower bearing element.

The open portion of the housing is sealed against dirt and water by a conventional rubber boot 58, which is provided with a plastic or metal snap ring 60. The snap ring may be vulcanized or adhesive bonded to the rubber boot. The snap ring is seated in a counterbore 62 in the housing inner wall. The opposite end of the boot 64 is sealed against the ball stud shank 18.

The ball joint illustrated in the drawings is easily assembled from one end of the housing without the use of special tools or temporary locking means to restrain the spring. The upper bearing 14 is first seated in the housing 10, and locked in place. The ball member is then inserted through the open end of the housing and seated in the upper bearing surface 42. The lower bearing, with the spring 22 secured to it at 54, is then threaded firmly on the upper bearing. The spring 22 is tensioned around the lower bearing from the open end and snapped into the slot 52 in the housing. Finally, the boot 58 is slipped over the ball stud 18, and the ring 60 is snapped into place. It can be seen from FIG. 1 that the snap ring 60 also functions to prevent accidental removal of the spring 22 when it is in place.

What is claimed is:

1. An automatically adjustable ball joint comprising: a housing defining a ball-receiving chamber therein having an open end, an externally threaded bearing element received within said housing chamber having a bearing surface facing the opening of said housing, a stud having an enlarged head received within said housing chamber in bearing engagement with said bearing surface with a shank extending out of the housing chamber through said open end, an internally threaded bearing element disposed within said housing chamber having a bearing surface opposed to the bearing surface of said externally threaded bearing element in bearing engagement with the opposed surface of said stud head and threadably received on said externally threaded bearing element, and a helical spring disposed about the periphery of one of said bearing elements between it and the housing and defining a split annulus in one plane and operably connected to one of said bearing elements and said housing continuously rotatably urging said one bearing element threadably toward the opposed bearing element to urge the head of said stud against the bearing surface of said opposed bearing element.

2. A self-adjusting compression-loaded ball joint device comprising: a housing having an open-ended socket, a spherically curved bearing surface in the socket opposite the open end, a stud having an enlarged head engaging said bearing surface and having a shank projecting out of the open end of the socket, and annular synthetic resin bearing element having a flexible skirt portion projecting toward the open end of the socket and spaced from the encircling housing wall, said skirt portion having a spherically curved bearing surface engaging the enlarged head and opposed to the first-mentioned bearing surface, said annular bearing element threadably engaged with a portion of the device adjacent the other end of the housing through self-locking threads having a gradual pitch to be threadedly shifted toward the first-mentioned bearing surface for continually non-reversibly uring the enlarged head thereagainst, and spring means connected to said annular bearing elment and to a portion of the device imparting a force sufficient to overcome frictional resistance to threading which continually rotatably urges the element in the aforesaid movement.

References Cited

UNITED STATES PATENTS

| | | | |
|---|---|---|---|
| 1,116,768 | 11/1914 | Underwood | 287—87 XR |
| 1,179,110 | 4/1916 | Kimman | 287—87 XR |
| 1,438,971 | 12/1922 | Vanderlip | 85—32.5 |
| 1,650,629 | 11/1927 | Johnson. | |
| 1,966,780 | 7/1934 | Wyrick | 85—32.5 XR |
| 1,996,994 | 4/1935 | Grubb | 287—87 |

FOREIGN PATENTS

| | | |
|---|---|---|
| 642,487 | 9/1950 | Great Britain. |
| 813,044 | 5/1959 | Great Britain. |
| 1,317,537 | 1/1963 | France. |

EDWARD C. ALLEN, *Primary Examiner.*

CARL W. TOMLIN, *Examiner.*

A. KUNDRAT, *Assistant Examiner.*